(12) United States Patent
Theil et al.

(10) Patent No.: US 11,186,730 B2
(45) Date of Patent: Nov. 30, 2021

(54) CHROMIUM-FREE COATING COMPOSITION WITH ANTI-CORROSIVE EFFECT FOR METALLIC SUBSTRATES

(71) Applicant: Akzo Nobel Coatings International B.V., Arnhem (NL)

(72) Inventors: Hubert Theil, Shanghai (CN); Andre Brosseit, Hamm (DE); Hendrik Narjes, Ascheberg (DE); Thorsten Gelbrich, Münster (DE); Justina Muehlmeyer, Bad Iburg (DE); Andrea Hoene, Warendorf (DE)

(*) Notice: Subject to any disclaimer, the term of this patent is extended or adjusted under 35 U.S.C. 154(b) by 261 days.

(21) Appl. No.: 16/463,770

(22) PCT Filed: Nov. 29, 2017

(86) PCT No.: PCT/EP2017/080762
§ 371 (c)(1),
(2) Date: May 23, 2019

(87) PCT Pub. No.: WO2018/099942
PCT Pub. Date: Jun. 7, 2018

(65) Prior Publication Data
US 2019/0375947 A1 Dec. 12, 2019

(30) Foreign Application Priority Data
Nov. 30, 2016 (EP) .................................. 16201311

(51) Int. Cl.
C09D 5/08 (2006.01)
C09D 5/00 (2006.01)
C09D 163/00 (2006.01)
C08K 5/39 (2006.01)

(52) U.S. Cl.
CPC ............. *C09D 5/086* (2013.01); *C09D 5/002* (2013.01); *C09D 163/00* (2013.01); *C08K 5/39* (2013.01)

(58) Field of Classification Search
CPC ...... C08L 63/00–10; C09D 163/00–10; C09D 5/002; C09D 5/086; C08K 5/39
See application file for complete search history.

(56) References Cited

U.S. PATENT DOCUMENTS

| | | | | |
|---|---|---|---|---|
| 4,560,716 A | * | 12/1985 | Sato | C08K 5/39 523/451 |
| 6,241,830 B1 | | 6/2001 | Shimakura et al. | |
| 10,513,783 B2 | | 12/2019 | Tsujita et al. | |
| 2008/0026233 A1 | | 1/2008 | Kunz et al. | |
| 2008/0216705 A1 | | 9/2008 | Hayes et al. | |
| 2009/0214883 A1 | | 8/2009 | De et al. | |
| 2009/0297818 A1 | * | 12/2009 | Williams | B29C 70/504 428/292.4 |
| 2010/0243108 A1 | | 9/2010 | Karabin et al. | |
| 2015/0322271 A1 | | 11/2015 | Labouche et al. | |
| 2016/0251542 A1 | | 9/2016 | Joege et al. | |

FOREIGN PATENT DOCUMENTS

| | | |
|---|---|---|
| DE | 19938335 | 2/2000 |
| JP | H0565450 | 8/1993 |
| RU | 2405064 | 11/2010 |
| RU | 2454486 | 6/2012 |
| RU | 2503697 | 1/2014 |
| RU | 2014129917 | 2/2016 |
| WO | 2015185266 | 12/2015 |
| WO | 2018099942 | 6/2018 |

OTHER PUBLICATIONS

Scifinder, CAS 14484-64-1 (2021).*
"Rompp Lexicon, Lacks und Druckfarben," Geord Thieme Verlag 1998, p. 250. with English Translation.
"Aerospace series—Tartaric-Sulphuric-Acid anodizing of aluminium and aluminium wrought alloys for corrosion protection and paint pre-treatment (TSA)," NEN-EN 4704 European Standard English Version, Feb. 2012 (16 pages).
Harvey, T.G. et al., "The effect of inhibitor structure on the corrosion of AA2024 and AA7075," Corrosion Science 53 (2011) 2184-2190 (7 pages).
"International Preliminary Report on Patentability," for PCT Application No. PCT/EP2017/080762 dated Oct. 18, 2018 (14 pages).
"International Search Report and Written Opinion," for PCT Application No. PCT/EP2017/080762 dated Feb. 9, 2019 (12 pages).
"Paints and Varnishes—Terms and Definitions (NEN-EN-ISO 4618: 2007)," European Standard Oct. 2006 (40 pages).
"Paints, varnishes and plastics—Determination of non-volatile matter content (ISO 3251 :2008, IDT)," European Standard NEN-EN-ISO 3251 Feb. 2008 (18 pages).
"Plastics—Epoxy compounds—Determination of epox equivalent (ISO 3001:1999, IDT)," European Standard English Version, Feb. 1999 (15 pages).
"Plastics—Amine epoxide hardeners—Determination of primary, secondary and tertiary amine group nitrogen content (ISO 9702:1996)," European Standard, Aug. 1998 (15 pages).
"Office Action," for Russian Patent Application No. 2019119373 dated Feb. 3, 2021 (7 pages) English Translation Only.
"Search Report," for Russian Patent Application No. 2019119373 dated Feb. 3, 2021 (3 pages) English Translation Only.

* cited by examiner

*Primary Examiner* — Kregg T Brooks
(74) *Attorney, Agent, or Firm* — Pauly, DeVries Smith & Deffner LLC

(57) ABSTRACT

The present disclosure relates to a chromium-free coating composition including at least one binder and at least one iron(III)-tris(N,N-dithiocarbamate) complex, where the binder includes at least one synthetic resin and at least one crosslinker. The present disclosure also relates to the use of such a coating composition for the protection against corrosion of metallic substrates, a process for at least partially coating a metallic substrate with such a priming coat, a substrate at least partially coated therewith and an article or a component made of such a substrate.

12 Claims, No Drawings

CHROMIUM-FREE COATING COMPOSITION WITH ANTI-CORROSIVE EFFECT FOR METALLIC SUBSTRATES

CROSS-REFERENCE TO RELATED APPLICATIONS

This application is a national stage application under 35 U.S.C. 371 of International Patent Application Serial No. PCT/EP2017/080762, entitled "CHROMIUM-FREE COATING COMPOSITION WITH ANTI-CORROSIVE EFFECT FOR METALLIC SUBSTRATES," filed Nov. 29, 2017, which claims priority from EP Applicaion No. 16201311.4 filed on Nov. 30, 2016 the disclosure of which is incorporated herein by reference.

FIELD OF THE TECHNOLOGY

The present disclosure relates to a chromium-free coating composition comprising at least one binder and at least one iron (III)-tris(N,N-dithiocarbamate) complex, wherein the binder includes at least one synthetic resin and at least one crosslinker. The present disclosure also relates to the use of such a coating composition for protection against corrosion of metallic substrates, a process for the at least partial coating of a metallic substrate with such a priming coat, a substrate at least partially coated therewith and an article or a component made of such a substrate.

BACKGROUND

In many areas such as e.g. the area of aircraft manufacturing and maritime shipping as well as in the case of large-scale production equipment such as wind turbines, the metallic components used in each case generally have to be protected against corrosion. The requirements for the protection against corrosion to be obtained are very high, in particular because from the side of the manufacturer often a many-year guarantee against rusting through is provided. Moreover, in particular in the field of aviation often very strict requirements for protection against corrosion are set. Corrosion protection is usually achieved through coating the components or the substrates used for their production with at least one suitable coating therefor.

To obtain sufficient protection against corrosion of metallic substrates such as aluminium or aluminium alloys or also optionally galvanized steels usually anti-corrosive pigments based on chromium-containing compounds such as chromate are used, which admittedly offer good protection against corrosion but because of their toxicity are disadvantageous on health and ecological grounds.

Harvey et al. in *Corrosion Science* 53 (2011) 2184-2190, disclose chromium-free corrosion inhibitors especially for aluminium alloys in the area of aircraft manufacturing which are based on inorganic compounds (e.g. tungstates, molybdates, vanadates, phosphates, borates, silicates, nitrates, etc.), organic compounds (benzotriazoles, mercaptoenzothiazoles) or combinations of organic and inorganic compounds. The corrosion-inhibiting effect of the substance to be investigated in that case is determined by immersing an aluminium substrate in a solution containing the substance to be investigated and determining the weight loss of the substrate after removing the corrosive products. According to this method sodium-diethyldithiocarbamate, which is readily water-soluble, generally speaking shows good corrosion inhibition.

DE 199 38 335 A1 discloses a chromium-free anti-corrosive treatment method for preventing the formation of white rust. The method provides for the pretreatment of a metal with an aqueous solution containing phosphorus ions-containing compounds, after which an aqueous anti-corrosive coating containing an aqueous resin and one or more sulfur compounds, e.g. sodium-dimethyldithiocarbamate or zinc(II)-bis(dimethyl dithiocarbamate), is applied.

There is a need for chromium-free primer coating compositions which are suitable for coating of metallic substrates, in particular metallic substrates from the area of aircraft manufacturing, such as aluminium and aluminium alloys. Such coating compositions should be able to replace conventional chromium-based coating compositions and enable a more economical and more ecological coating process compared to traditionally used chromium-based coating compositions. At the same time, the coating composition should achieve the required anti-corrosive effect at least to the same extent as the conventional chromium-based standard in the industry.

SUMMARY

Aspects herein related to an aqueous chromium-free coating composition. In an embodiment, the coating composition can include at least one binder including at least one synthetic resin and at least one crosslinker. The coating composition can include at least one iron(III)-tris(N,N-dithiocarbamate) complex of the general formula (I) $[R^1-N(-R^2)-C(=S)-S]_3Fe^{+III}$, where (i) $R^1$ and $R^2$, independently include a univalent linear, branched or cyclic aliphatic hydrocarbon radical with 1 to 10 carbon atoms; or (ii) $R^1$ includes a divalent linear or branched aliphatic hydrocarbon radical with 1 to 10 carbon atoms, $R^2$ represents a covalent bond, and $R^1$ is linked by the covalent bond with the nitrogen atom of formula (I). The water content in the coating composition is at least 50.0 wt. % based on the total content of liquid diluents present in the coating composition.

In an embodiment, the iron(III)-tris(N,N-dithiocarbamate) complex has a solubility in water at 20° C. of less than 0.1 mol/L.

In an embodiment, the iron(III)-tris(N,N-dithiocarbamate) complex is present in an amount in the range of 0.01 to 25 wt. %, based on the non-volatile content of the coating composition as determined according to DIN EN ISO 3251 dated June 2008.

In an embodiment, the at least one iron(III)-tris(N,N-dithiocarbamate) complex is selected from the group including iron(III)-tris(dimethyl dithiocarbamate), iron(III)-tris(diethyl dithiocarbamate) and iron(III)-tris(pyrrolidine dithiocarbamate).

In an embodiment, the binder includes at least one epoxide resin and at least one crosslinker having at least one functional amino group.

In an embodiment, the at least one epoxide resin has an epoxide equivalent weight in a range of 100 to 300, as determined according to DIN EN ISO 3001 dated November 1999.

In an embodiment, a process for at least partially coating a metallic substrate with a priming coat is provided. The process can at least partially contacting the metallic substrate with the coating composition. The coating composition can include at least one binder comprising at least one synthetic resin and at least one crosslinker. The coating composition can include at least one iron(III)-tris(N,N-dithiocarbamate) complex of the general formula (I): $[R^1-$ $N(-R^2)-C(=S)-S]_3Fe^{+III}$, where (i) $R^1$ and $R^2$, independently include a univalent linear, branched or cyclic aliphatic hydrocarbon radical with 1 to 10 carbon atoms; or (ii) $R^1$ includes a divalent linear or branched aliphatic hydrocarbon radical with 1 to 10 carbon atoms, $R^2$ represents a covalent bond and $R^1$ is linked the covalent bond with the nitrogen atom of formula (I). The water content in the coating composition is at least 50.0 wt. % based on the total content of liquid diluents present in the coating composition.

In an embodiment, the process further includes at least partially contacting the metallic substrate with the coating composition includes at least partially applying a priming coat on the substrate; and applying at least one further layer, including a top coat layer or a clear coat layer, on the priming coat.

In an embodiment, the process further includes before at least partially contacting the metallic substrate with the coating composition, the metallic substrate is pretreated with a tartaric acid-sulfuric acid-anodization (TSA) according to DIN EN 4704.

In an embodiment, the process further includes a metallic substrate is an aluminium alloy of the group 2XXX or 7XXX.

In an embodiment, the process further includes where the coating compositing is configured for protection against corrosion of metallic substrates.

In an embodiment, a metallic substrate coated at least partially with a coating composition the coating composition is provided. The coating composition can include at least one binder including at least one synthetic resin and at least one crosslinker. The coating composition can include at least one iron(III)-tris(N,N-dithiocarbamate) complex of the general formula (I) comprising $[R^1-N(-R^2)-C(=S)-S]_3Fe^{+III}$, where (i) $R^1$ and $R^2$, independently can be a univalent linear, branched or cyclic aliphatic hydrocarbon radical with 1 to 10 carbon atoms; or (ii) $R^1$ can be a divalent linear or branched aliphatic hydrocarbon radical with 1 to 10 carbon atoms, $R^2$ represents a covalent bond, and $R^1$ is linked by means of the covalent bond with the nitrogen atom of formula (I). The water content in the coating composition is at least 50.0 wt. % based on the total content of liquid diluents present in the coating composition.

In an embodiment, the metallic substrates include metallic substrates within the area of aircraft manufacturing.

One object of the embodiments described herein is to provide a coating composition for the at least partial coating of a metallic substrate with a priming coat which shows advantages vis-à-vis the coating compositions known from the prior art. It is an object of the embodiments described herein to provide such coating compositions which make possible a more ecological profile of the coating composition and the coating process vis-à-vis traditionally used coating compositions. For instance they should make it possible to work without the common addition of chromium or chromium-containing compounds, but with which at least the same anti-corrosive effect can be achieved.

The above-described needs are addressed by the provision of a chromium-free coating composition according to the present disclosure, described in detail herein-below.

According to a first aspect, the embodiments herein provide a chromium-free aqueous coating composition including at least one binder including at least one synthetic resin and at least one crosslinker. The coating compositions herein can further include at least one iron(III)-tris(N,N-dithiocarbamate) complex of the following general formula (I):

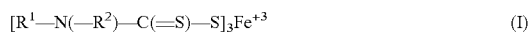  (I)

wherein $R^1$ and $R^2$ independently can be a univalent linear, branched or cyclical aliphatic hydrocarbon radical with 1 to 10 carbon atoms, or $R^1$ can be a divalent linear or branched aliphatic hydrocarbon radical with 1 to 10 carbon atoms, $R^2$ can represent a covalent bond and $R^1$ can be linked by the covalent bond to the nitrogen atom of formula (I).

The new chromium-free coating composition will be designated hereinafter also as coating composition according to the various embodiments herein. In some embodiments, the coating composition can come from the following description.

According to another aspect, the present disclosure also provides a process for the at least partial coating of a metallic substrate with a priming coat using the chromium-free aqueous coating composition according to the various embodiments herein, which process can omit a chromate coating of the used substrate to be carried out under considerations which are toxicologically questionable in particular in the area of aircraft manufacturing. As a result, the corresponding coating process can be made altogether more ecological and more economical than traditional processes.

According to a further aspect, the present disclosure provides the use of the coating composition according to the various embodiments herein, to obtain at least the same protection against corrosion of metallic substrates, in particular in the area of aircraft manufacturing.

The coating composition according to the present disclosure makes it possible to provide substrates at least partially coated with a priming coat which compared with substrates coated with traditionally used chromium-based coating compositions show at least no disadvantages and show advantages with regard to their protection against corrosion.

DETAILED DESCRIPTION

The coating composition according to the various embodiments herein is chromium-free. A coating composition is designated as chromium-free or essentially chromium-free when there is less than 0.1 wt. %, less than 0.05 wt. %, and in some embodiment less than 0.01 wt. %, based on the total weight of the coating composition, of chromium-containing compounds present in the coating composition. In various embodiments, no chromium-containing compounds at all are present in the coating composition.

The coating composition according to the various embodiments herein can be in the form of a dispersion or solution. In some embodiments, the coating composition is in the form of a dispersion.

The coating composition according to the various embodiments herein can be an aqueous coating composition. The term "aqueous" in connection with the coating compositions herein, means a coating composition which contains—as liquid diluent and/or dispersant—water as main component (with regard to the used diluent). In some embodiments, the water content in the coating composition is at least 50.0 wt. %. In other embodiments, the water content in the coating composition is at least 60.0 wt. %, at least 70 wt. %, at least 80 wt. %, or at least 90 wt. %, in each case based on the total content of the liquid diluents present in the coating composition. As further diluents e.g. organic solvents may be considered.

The coating composition herein can include a non-volatile content in the range of 30 to 70 wt. %, in the range of 35 to 65 wt. %, in the range of 40 to 60 wt. %, or in the range of 45 to 55 wt. %, in each case based on the total weight of the coating composition.

Methods for determining the non-volatile content (also called the solids content) are known. Determination in that case proceeds according to the method described in the examples.

The coating composition according to various embodiments herein can include a priming coating composition, i.e. a coating composition which is suitable for the preparation of a priming coat. The term "primer" is defined e.g. in *Römpp Lexikon, Lacke and Druckfarben*, Georg Thieme Verlag 1998.

The coating composition according to various embodiments herein can include a pigment volume concentration (PVC) in a range of 20.0 to 70.0%. The term pigment volume concentration (PVC) is known. This term is defined in DIN EN ISO 4618 (date: March 2007). The pigment volume concentration (PVC) in that case means the ratio of the volume of pigments and fillers contained in the coating composition to the total volume of non-volatile ingredients in the coating composition, i.e. in particular the ratio of the volume of pigments and fillers present in the coating composition to the total volume of non-volatile ingredients of the pigments and fillers and binders (solids) present in the coating composition, multiplied by the factor 100.

In various embodiments, the coating composition can include a pigment volume concentration (PVC) in a range of 25.0 to 60.0% or in a range of 30.0 to 50.0%.

Binder (A)

The coating composition according to various embodiments herein include at least one binder (A) including at least one synthetic resin (A1) and at least one crosslinker (A2).

As used herein "binder" in accordance with DIN EN ISO 4618 (German edition, date: March 2007) includes the non-volatile contents of a coating composition, such as the coating compositions described herein. Pigments and fillers optionally present therein thus are not subsumed under the term binder. According to DIN EN ISO 3251 (date: June 2008), the non-volatile content can be determined according to the method described in the examples. In particular term "binder" encompasses the synthetic resins (A1) present in the coating composition which are responsible for film forming. The term "binder" in addition encompasses any crosslinker present in the coating composition, such as e.g. component (A2).

The terms "synthetic resin" and "crosslinker" are used herein for improved clarity or and differentiability. Both terms are known, and in this respect have a clarifying character. Basically in the case of externally crosslinking thermal curing of a coating composition a crosslinking takes place between the functional groups of a polymer or synthetic resin and the functional groups of the crosslinker which are complementary or reactive therewith.

Thus, the coating composition according to the various embodiments herein is thermally curable, i.e. through the chemical reaction of reactive functional groups such as described above a crosslinking (forming of a coating film) can take place, in which process energetic activation of this chemical reaction is possible through thermal energy and optionally under catalytic action of catalysts.

Further curing mechanisms, e.g. a proportional physical curing (i.e. the curing of a layer of a coating composition through film forming through solvent loss from the coating composition, where the crosslinking takes place within the coat by means of loop formation of the polymer molecules), are not excluded. Physical curing in particular will always take place proportionally.

For the preparation of the coating composition according to the various embodiments herein, use is made of a solution or dispersion, such as at least one solution, including the at least one synthetic resin (A1). In some embodiments, the synthetic resin (A1) is used directly or, to increase flowability, in diluted form. The preparation of the coating composition according to the various embodiments herein can include at least one solution or dispersion, such as a solution of the at least one crosslinker (A2) is used, which shortly before the preparation of the coating composition is combined directly with the synthetic resin (A1), its dilution or a synthetic resin (A1)-containing solution or dispersion (2K coating composition).

All traditional binders known in that case are suitable as binder (A) of the coating composition according to the various embodiments herein.

The binder (A) can include at least one synthetic resin (A1), which has reactive functional groups that make a crosslinking reaction possible. The synthetic resin (A1) can include a thermally externally crosslinking synthetic resin. In order to make a crosslinking reaction possible, the binder (A) in addition to the at least one synthetic resin (A1) can include at least one crosslinker (A2).

The synthetic resin (A1) present in the binder (A) and the additionally present at least one crosslinker (A2) can be thermally externally crosslinking at heating to temperatures at or above 18-23° C., in which process there will also be a proportional physical curing.

Every common crosslinkable reactive functional group known is suitable as crosslinkable reactive functional group of synthetic resin (A1). In some embodiments, the synthetic resin (A1) has at least one type of functional reactive groups, selected from group consisting of primary amino groups, secondary amino groups, hydroxyl groups, thiol groups, carboxyl groups, groups, which have at least one C=C-double bond, such as e.g. vinyl groups or (meth)acrylate groups, and epoxide groups as well as mixtures thereof. In some embodiments, the synthetic resin (A1) includes hydroxyl groups, carboxyl groups and/or epoxide groups, in particular epoxide groups.

The terms "(meth)acryl" and "(meth)acrylate", respectively, herein include the meanings "methacryl" and/or "acryl" and "methacrylate" and/or "acrylate", respectively.

The synthetic resin (A1) of the binder (A) has a content of crosslinkable reactive functional groups such as e.g. epoxide groups, in the range of 1.0 wt. % to 30 wt. %, in the range of 2.5 to 25 wt. %, in the range of 5.0 to 20.0 wt. %, or in the range of 10.0 to 15.0 wt. %, in each case based on the total weight of the solids content of synthetic resin (A1).

The at least one synthetic resin (A1) of the at least one binder (A) can be thermally curable in the presence of the at least one crosslinker (A2). In various embodiments, such curing already takes place at room temperature, i.e. at a temperature in the range of 18° C. to 23° C. In some embodiments, such a curing can take place at temperatures in the range of 25° C. to 80° C. or at higher temperatures, e.g. at temperatures ≥80° C., ≥110° C., ≥140° C. or ≥170° C.

In various embodiments, the binder (A) can include at least one synthetic resin (A1) selected from the group including of polyurethanes, polyesters, polyamides, polyureas, polystyrenes, polycarbonates, poly(meth)acrylates, vinyl ester-based resins, epoxide resins, phenol-formaldehyde resins, melamine-formaldehyde resins, phenol resins and silicon resins as well as mixtures thereof. In some embodiments, 70 to 100 wt. % of the synthetic resins (A1) can be selected from at least one of the aforementioned polymers. In that case by the said polymers can include both homo- and corresponding co-polymers are meant.

In various embodiments, the binder (A) can include at least one synthetic resin (A1) selected from the group consisting of epoxide resins, where the at least one synthetic resin (A1) of the binder (A) is selected for 70 to 100 wt. % from at least one such epoxide resin. Such epoxide resins are known. In some embodiments, the epoxide resins have at least two terminal epoxide groups. In some embodiments, the epoxide resins include polyglycidyl ethers of polyphenols prepared from polyphenols and epihalohydrins. As polyphenols can be used in particular Bisphenol A and/or Bisphenol F. Further suitable polyepoxides are polyglycidyl ethers of polyvalent alcohols, such as e.g. ethylene glycol, diethylene glycol, triethylene glycol, 1,2-propylene glycol, 1,4-propylene glycol, 1,5-pentane diol, 1,2,6-hexane triol, glycerin and 2,2-bis(4-hydroxycyclohexyl)propane. Suitable for use as polymeric epoxide resins (A1) are for instance the commercially available products Epoxy Novolac® or D.E.N.® such as e.g. D.E.N.® 438-X80 or Polypox® such as Polypox® R19 ex Dow Chemicals and/or the commercially available products Araldite® ex Huntsman such as e.g. Araldite® EPN 1180, Araldite® EPN 1180 X-80 or Araldite® DY 3601.

The synthetic resin (A1) can include an epoxide equivalent weight (i.e., EEW) in a range of 100 to 300, or in a range of 150 to 280. The epoxide equivalent weight is the mass of synthetic resin (A1) which contains precisely 1 mol epoxide groups. The epoxide equivalent weight can be determined according to DIN EN ISO 3001 (date: November 1999).

As crosslinker (A2) are suitable all the usual crosslinkers such as e.g. polyamines, aminoplasts, phenoplasts, polyfunctional Mannich bases, melamine resins, benzoguanamine resins, beta-hydroxyalkylamides, tris(alkoxycarbonylamino)triazines, free polyisocyanates and/or blocked polyisocyanates, as well as compounds with on average at least two groups capable of transesterification, e.g. reaction products of malonic acid diesters and polyisocyanates or of esters and partial esters of polyvalent alcohols of malonic acid with monoisocyanates. In some embodiments, the crosslinker (A2) is a polyamine, i.e. an amine with at least two amino groups, selected from the group including primary and secondary amino groups. In some embodiments, 70 to 100 wt. % of the crosslinker (A2) is selected from at least one polyamine. The crosslinker (A2) in that case can include two or several different polyamines.

In various embodiment, the binder (A) includes at least one synthetic resin (A1), in particular at least one epoxide resin, which is cured or crosslinked with the participation of amino groups. Accordingly the at least one crosslinker (A2) can include amino groups.

In some embodiments, crosslinker (A2) includes at least one polyamine. Polyamines with amino groups are known. Suitable as crosslinker (A2) are for instance the commercially available products Aradur®, such as e.g. Aradur® 3986 BD, Waterpoxy®, such as e.g. Waterpoxy® 751, or Cardolite®, such as e.g. Cardolite® NH 2000.

In some embodiments, the at least one crosslinker (A2) has an amine number in a range of 50 to 300, in a range of 100 to 250, or in a range of 150 to 220. In some embodiments, the amine number can determined according to DIN EN ISO 9702 (date: October 1998).

To accelerate the crosslinking suitable catalysts can be added to the coating composition.

Such catalysts are also known. Use can for instance be made of the commercially available product Ancamine® K54.

The relative weight ratio of the at least one synthetic resin (A1) to the at least one crosslinker (A2) in the coating composition according to the various embodiments herein can include those within a range of 4:1 to 1:1, in a range of 3:1 to 1:1, in a range of 2.5:1 to 1:1, in a range of 2.2:1 to 1:1, or in a range of 1.8:1 to 1:1, in each case based on the solids content of the at least one synthetic resin (A1) and the at least one crosslinker (A2). In to various embodiments, the relative weight ratio of the at least one synthetic resin (A1) to the at least one crosslinker (A2) in the coating composition herein can include those within a range of 4:1 to 1:0.6, in a range of 3:1 to 1:0.6, in a range of 2.5:1 to 1:0.6, in a range of 2.2:1 to 1:0.6, or in a range of 1.8:1 to 1:0.6, in each case based on the solids content of the at least one synthetic resin (A1) and the at least one crosslinker (A2) within the coating composition.

The coating composition according to the various embodiments herein can include the binder (A), determined by means of the solids, in an amount of 10 to 55 wt. %, in an amount of 15 to 50 wt. %, in an amount of 15 to 40 wt. %, or in an amount of 18 to 30 wt. %, based on the total weight of the coating composition.

In some embodiments, the binder (A) can include at least one epoxide resin (A1), having an epoxide equivalent value (EEW) in a range of 100 to 300, and at least one crosslinker (A2) having amino groups.

In some embodiments, the at least one epoxide resin (A1) can include functional silane groups. In various embodiments, the coating compositions can further include at least one additive with silane groups.

The iron(III)-tris(N,N-dithiocarbamate) Complex (B)

The coating composition according to the various embodiments herein can include at least one iron(III)-tris(N,N-dithiocarbamate) complex (B).

Dithiocarbamates (also referred to as dithiourethanes) are known. They are stable salts and esters of unstable dithiocarbamide acids with the general structure R—N(—R")—C(=S)—S—R', wherein R, R' and R" in general represent exchangeable alkyl radicals. In general dithiocarbamates have poor solubility both in water and in organic solvents and are formed at the reaction of carbon disulfide with ammonia and primary and secondary amines They are typically used as vulcanization accelerators and as fungicides for plant and material protection. Upon contact with traces of heavy metals, e.g. Cu, Fe, dithiocarbamates form colorful complexes, which potentially cannot be tolerated in the use of dithiocarbamates for material protection. Known examples for dithiocarbamates for use as fungicide are e.g. ferbam (iron(III)-tris(N,N-dimethyl dithiocarbamate)) and ziram (Zinc(II)-bis(dimethyl dithiocarbamate)). The latter can also be used as coating fungicide.

In inorganic dithiocarbamate complexes an inorganic atom is present, on which the dithiocarbamates coordinate. The number of coordinating dithiocarbamates in that case is determined through the oxidation number of the inorganic atom.

In the framework of the various embodiments herein, at least one iron(III)-tris(N,N-dithiocarbamate) complex is present in the coating composition. In this case we are therefore dealing with compounds where three dithiocarbamates coordinate on an iron-ion with the oxidation number three (Fe(III)), in order to develop a complex.

In general dithiocarbamates are poorly soluble or even insoluble in water as well as in organic solvents. However, easily water-soluble or moderately water-soluble metal-dithiocarbamate complexes such as e.g. sodium-diethyldithiocarbamate or ammonium-pyrrolidine-dithiocarbamate are also known.

Solubility in that case is the property of a substance to dissolve homogeneously in a liquid. Solubility is described through the solubility limits in the form of the saturation concentration. If at 20° C. the amount of maximally dissolved substance is less than 0.1 mol/L of dissolved substance, then this is referred to as poorly soluble, between 0.1 and 1 mol/L as moderately soluble and at a solubility of more than 1 mol/L as easily soluble. Solubility in this case refers to solubility in water. Solubility can be measured by preparing a salt solution at 20° C. in 100 ml demi-water and adding the salt until a saturated solution is obtained, filter the solution and determine the salt concentration in the filtrate, e.g. by inductively coupled plasma (ICP) emission spectrometer.

In any case in the various embodiments herein use is made of iron(III)-tris(N,N-dithiocarbamate) complexes. Such complexes, as is known, are to be classified as poorly soluble.

The iron(III)-tris(N,N-dithiocarbamat) complexes (B) can be described by means of the following general formula (I):

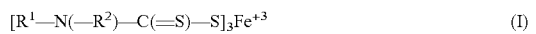

$$[R^1-N(-R^2)-C(=S)-S]_3Fe^{+3} \quad (I)$$

where
(i) $R^1$ and $R^2$, independently can include a univalent linear, branched or cyclic aliphatic hydrocarbon radical with 1 to 10 carbon atoms,
or
$R^1$ can include a divalent linear or branched aliphatic hydrocarbon radical with 1 to 10 carbon atoms, $R^2$ represents a covalent bond, and $R^1$ is crosslinked via this covalent bond with the nitrogen atom of formula (I).

The radicals $R^1$ and $R^2$ are the same or different radicals. In some embodiments, the radicals are the same radicals. They represent linear, branched or cyclic aliphatic hydrocarbon radicals with 1 to 10, 1 to 8, 1 to 6, or 1 to 4 carbon atoms. Alternatively $R^1$ represents a divalent linear or branched aliphatic hydrocarbon radical with 1 to 10, 1 to 8, 1 to 6, or 1 to 4 carbon atoms, and $R^2$ represents a covalent bond, where $R^1$ is crosslinked via the covalent bond with the nitrogen atom of formula (I).

An aliphatic compound is a saturated or unsaturated, organic (i.e. carbon and hydrogen-containing) compound, which is not aromatic or rather not araliphatic (mixed aromatic-aliphatic). In the framework of the various embodiments herein an aliphatic compound consists exclusively of interlinked carbon and hydrogen atoms, which can be crosslinked with one another both cyclically and acyclically.

In an acyclic aliphatic compound the carbon atoms are crosslinked with one another linearly (e.g. n-propyl) or branched (e.g. iso-propyl). A linear compound thus has no branchings with regard to the carbon chain, i.e. the carbon atoms are arranged exclusively in linear sequence in a chain. Branched or rather non-linear thus means in the framework of the various embodiments herein that the considered compound in each case has a branching in the carbon chain, i.e. thus other than in the case of the linear compounds, at least one carbon atom of the compound in question is a tertiary or quarternary carbon atom. Referred to as cyclic aliphatic compounds or rather cyclic-aliphatic compounds are those compounds wherein at least one part of the carbon atoms present in the molecule are so crosslinked that one or several rings are formed. Of course in addition to the one or several rings further acyclic linear or branched aliphatic groups or rather molecule shares can be present in a cyclic-aliphatic compound.

An aliphatic hydrocarbon radical consequently is a radical which meets the requirements set out above for the aliphatic compounds, yet is only a part of a molecule.

A univalent radical is a radical which is tied to the radical of the molecule by means of a covalent bond. A divalent radical accordingly is a radical which is linked to the radical of the molecule by means of two covalent bonds.

The information in definition (ii) of the radicals $R^1$ and $R^2$, in particular that the radical $R^2$ represents a covalent bond. The radical $R^2$ in this case replaces the covalent bond between $R^2$ and the nitrogen atom of the dithiocarbamate drawn in formula (I), so that finally a ring structure is formed. The radical $R^1$ can for instance represent a divalent aliphatic radical formed from 4 carbon atoms, which under inclusion of the nitrogen atom of formula (I) forms a pyrrolidine, which can also be substituted further.

In an embodiment according to variant (i) the radicals $R^1$ and $R^2$ are the same or different univalent linear, branched or cyclic aliphatic hydrocarbon radicals with 1 to 8, 1 to 6, or 1 to 4 carbon atoms.

In some embodiments, the radicals $R^1$ and $R^2$ according to variant (i) are a methylene or ethylene radical.

In other embodiments, according to variant (ii) $R^1$ is a divalent linear or branched aliphatic hydrocarbon radical with 1 to 8, 1 to 6, or 1 to 4 carbon atoms and $R^2$ is a covalent bond, wherein $R^1$ is linked to the nitrogen atom of the dithiocarbamate of formula (I) by means of the covalent bond $R^2$.

In some embodiments, $R^1$ according to variant (ii) is a divalent butylene radical and $R^2$ represents a covalent bond, as a result of which $R^1$ is linked on both ends of its 4-membered carbon chain with the nitrogen atom of the dithiocarbamate of formula (I) and thus forms a pyrrolidine.

In some embodiments, iron(III)-tris(N,N-dithiocarbamate) complexes (B) are iron(III)-tris(N,N-dimethyl dithiocarbamate), iron(III)-tris(N,N-diethyl dithiocarbamate) and iron(III)-tris(pyrrolidine dithiocarbamate).

The content of (B) in the coating composition according to the embodiments herein can vary depending on the intended use. The content of the at least one iron(III)-tris (N,N-dithiocarbamate) complex (B) can be in the range 0.01 to 25.0 wt. %, in the range 0.05 to 20.0 wt. %, in the range 0.1 to 20.0 wt. %, in the range 1.0 to 18.0 wt. %, and or in the range 3.0 to 16.0 wt. %, in each case based on the non-volatile content of the coating composition.

Further Optional Components (C)

The coating composition according to the various embodiments herein can include at least one further component (C).

In various embodiments, this at least one further component (C) can be selected from the group including of various pigments, fillers, anti-oxidants, antistatic agents, wetting and dispersing agents, adhesion promoters, anti-settling agents, emulsifiers, flow control agents, solubility aids, antifoaming agents, wetting agents, stabilizers, UV and/or light stabilizers, screening agents, de-aerators, inhibitors, catalysts, waxes, flexibilization agents, flame retardants, water-repellent agents, hydrophilizing agents, thixotropic agents, impact resistors, process adjuvants, plasticizers, and mixtures of the aforementioned components. The content of (C) in the coating composition can vary widely depending on the intended use. In some embodiments the content of the at least one component (C) is in the range 0.01 to 60.0 wt. %, in the range 0.05 to 60.0 wt. %, in the range 0.1 to 60.0 wt. %, in the range 0.1 to 50.0 wt. %, or in the range 1.0 to 40.0 wt. %, in each case based on the total weight of the coating composition.

The term "pigment" is known, e.g. from DIN 55945 (date: October 2001). As used herein, "pigment" refers to powdery or flaky compounds which are essentially or fully insoluble in the medium surrounding them, such as e.g. in the coating composition. Pigments are distinguished from "fillers" through their index of refraction, which for pigments is ≥1.7.

Suitable pigments can be selected from the group including of inorganic and organic colour pigments, effect pigments and mixtures thereof. Examples for suitable inorganic colour pigments are white pigments such as lead free zinc white, zinc sulfide or lithopones; black pigments such as soot, iron-manganese-black or spinel black; bright colors such as chromium oxide, hydrate chromium oxide green, cobalt green or ultramarine green, cobalt blue, ultramarine blue or manganese blue, ultramarine violet or cobalt and manganese violet, red iron oxide, cadmium sulfoselenide, molybdate red or ultramarine red; brown iron oxide, mixed brown, spinel and corundum phases or chromium orange; or yellow iron oxide, nickel titanium yellow, chrome titanium yellow, cadmium sulfide, cadmium zinc sulfide, chrome yellow or bismuth vanadate. Examples of further inorganic colour pigments are silica, alumina, alumina hydrate, in particular boehmite, titanium dioxide, zirconium oxide, ceroxide and mixtures thereof. Examples for suitable organic colour pigments are monoazo pigments, bisazo pigments, anthraquinone pigments, benzimidazole pigments, quinacridone pigments, quinophthalone pigments, diketopyrrolopyrrol pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

The term "filler" is known, e.g. from DIN 55945 (date: October 2001). As used herein, "filler" refers to a substance which is essentially or fully insoluble in the coating composition according to the embodiments herein, which is used in particular to increase the volume. "Fillers" in the sense of the various embodiments herein can be distinguished from "pigments" through their index of refraction, which for fillers is <1.7. Any common filler known can be used. Examples of suitable fillers are kaolin, dolomite, calcite, chalk, calcium sulfate, barium sulfate, graphite, silicates such as magnesium silicates, in particular appropriate layered silicates such as hectorite, bentonite, montmorillonite, talcum and/or mica, silicic acids, in particular pyrogenic silicic acids, hydroxides such as aluminium hydroxide or magnesium hydroxide or organic fillers such as textile fibers, cellulose fibers, polyethylene fibers or polymer powder; in addition reference is made to *Römpp Lexikon Lacke and Druckfarben*, Georg Thieme Verlag, 1998, page 250 ff., «Füllstoffe».

A further subject herein is a process for the preparation of the coating composition as described elsewhere herein. The process according to the various embodiments herein includes at least the step of mixing the components (A), (B) and optionally (C).

This step of the process according to the various embodiments herein can be carried out by means of a high-speed mixer, dissolver or in-line-dissolver.

Processes

A further subject herein is a process for at least partially coating a metallic substrate with a priming coat comprising at least a step (1), (1) at least partially contacting the metallic substrate with the coating composition.

As used herein term "contacting" refers to immersion of the substrate to be coated in the coating composition, a spraying or sprinkling of the substrate with the coating composition or a roller application of the coating composition on the substrate to be coated.

In various embodiments, "contacting" is effected by spraying of the substrate which is to be at least partially coated with the coating composition. Such spraying can take place through electrostatic spraying, through air spray coating or through airless spray coating.

The applied coating composition is then cured or allowed to cure. The dry film thickness of the coating obtained as a result can be in a range of 5 to 35 μm, in particular 10 to 25 μm, as cured coat. The coat can for instance be cured by being heated for 10 to 40 minutes at 15 to 40° C.

The substrate to be partially coated in that case can be pretreated before step (1) with a suitable pretreatment method. In some embodiments, there is no pretreatment or a pretreatment of the metallic substrate with a tartaric acid-sulfuric acid-anodization (TSA) according to DIN EN 4704 (date: May 2012).

In some embodiments, a process for at least partially coating a metallic substrate with a priming coat thus can include at least steps (1) and (2) including:
 (1) pretreatment of the metallic substrate with a tartaric acid-sulfuric acid-anodization (TSA) according to DIN EN 4704 (date: May 2012), and
 (2) at least partially contacting the metallic substrate directly after step (1) with the coating composition.

The embodiments described herein above in connection with the coating composition as described herein can also be used in the process according to the various embodiments herein for at least partially coating a substrate with a priming coat.

A further subject of the various embodiments herein is a priming coat obtainable according to the above-indicated process.

A further subject of the various embodiments herein is a process for at least partially coating a substrate with a multilayer coating including at least the steps of:
 (1) at least partially contacting the metallic substrate with the coating composition for at least partial application of a priming coat on the substrate and
 (2) applying at least one further layer, including a top coat layer and/or a clear coat layer, on the priming coat applied according to step (1).

The embodiments described herein above in connection with the coating composition as described herein can also be used in the process according to the various embodiments herein for at least partially coating a substrate with a multilayer coating.

Commonly, at least one further layer is applied on the priming coat applied according to step (1), in particular a top coat layer and/or clear coat layer, or a top coat layer. In some embodiments, the priming coat is cured before the application of the further layer according to step (2). Typically, curing of the priming coat can take place for 10 to 40 minutes at 15 to 40° C., or at 18 to 23° C. In an embodiment, drying for a period of 1 to 24 hours at 15 to 40° C. is carried out before step (2).

In an embodiment of a process, before the contact with the coating composition, the metallic substrate is pretreated with a tartaric acid-sulfuric acid-anodization (TSA) according to DIN EN 4704 (date: May 2012). In an embodiment, a pretreatment of the metallic substrate with an aqueous solution containing phosphorus ions-containing compounds does not take place.

In an embodiment, a process for at least partially coating a substrate with a multilayer coating thus includes at least the steps of:
(1) pretreatment of the metallic substrate with a tartaric acid-sulfuric acid-anodization (TSA) according to DIN EN 4704 (date: May 2012),
(2) at least partially contacting the metallic substrate directly after step (1) with the coating composition for at least partial application of a priming coat on the substrate, and
(3) application of at least one further layer, can include a top coat layer or a clear coat layer, on the priming coat applied according to step (2).

The general application methods of the at least one further layer according to step (3) correspond to those as described above for the priming coat. The application of the at least one further layer, in particular of the top coat, takes place in the usual and familiar film thicknesses, e.g. in dry film thicknesses after curing in the range of 15 to 100 micrometers, in particular 25 to 80 or 28 to 70 micrometers.

The curing of the at least one further layer according to step (3) takes place alone or, in the case of more than one applied layer, jointly according to the usual and familiar methods such as e.g. heating in a circulating air oven or through irradiation with IR lamps. Also possible is actinic curing through e.g. UV irradiation in the case of radiation-curing systems.

The curing of the at least one layer according to step (3) can likewise take place alone or jointly with the curing of the priming coat according to step (2), i.e. the curing of the at least one further layer according to step (3) can take place separately or together with the priming coat according to step (2). The curing conditions, in particular the curing temperatures, conform e.g. to the temperature sensitivity of the used substrates or to the choice of the used binder. Thus the curing can take place e.g. in the range of room temperature (18 to 23° C.) or also at elevated temperatures in the range of e.g. 40° C. to 120° C., or 60° C. to 90° C. The duration of the curing phase is also selected individually and depends, among others, on the already mentioned factors (e.g. the choice of binder and/or curing temperatures). Thus the curing can take place over a period of 5 to 120 minutes, or 10 minutes to 40 minutes. The curing may optionally be preceded by a flash-off or rather predrying phase, e.g. at room temperature for a period of 1 to 60 minutes. In some embodiments, a drying or curing step for a duration of 1 to 168 hours at from 15 to 40° C. is carried out after step (2). Which curing conditions are to be used with which substrates and/or coating compositions is part of common general knowledge in the field, so that the condition can be adjusted and selected.

Substrate for the Process According to the Various Embodiments Herein

Suitable as substrate used according to the various embodiments herein are all metallic substrates. The substrates used according to various embodiments herein are not ferrous. In some embodiments, the substrates are selected from the group including magnesium, magnesium alloys, titanium, aluminium or aluminium alloys, in particular aluminium based alloys. Alloys can have at least a further metal and/or semimetal, such as e.g. copper. In some embodiments, the substrates can have at least one surface of magnesium, aluminium, or alloys thereof. In other embodiments, the surface is made up of aluminium or aluminium alloys. The aluminium or aluminium alloy can include cold-rolled or heat-treated, blank or provided with a metal plating (technical term: "clad") of e.g. aluminium.

Examples of suitable alloys are aluminium-copper alloys. In some embodiments, substrates can include aluminium or aluminium-containing alloys, in particular aluminium alloys of the groups 2xxx and 7xxx as named by "*The Aluminum Association*". Examples of aluminium alloys are 2024-T3 (blank or clad), 7075-T6 (blank or clad), 7017 and 7020.

In various embodiments, substrates of iron, steel and alloys thereof are suitable. Suitable as steel can include steel selected from the group consisting of cold-rolled steel, hot-rolled steel, high-tensile steel, galvanized steel such as hot-galvanized steel, alloy-galvanized steel (such as e.g. Galvalume®, Galvannealed® or Galfan®) and aluminized steel. In some embodiments, the substrates of steel or based on steel have a steel grade of at least 2.5. The steel grade can be determined according to DIN EN ISO 8501-1 (date: December 2007).

The used substrates in that case can be in particular parts of parts used in aircraft manufacturing for the construction of an aircraft. Before the substrate is used, a cleaning and/or a removal of fat from the substrate takes place.

Before the at least partial contacting with the coating composition according to the various embodiments herein, the metallic substrate to be used can be treated with a suitable aqueous pretreatment composition. Appropriate pretreatment compositions are known. Thus substrates of aluminium, based on aluminium or an aluminium-containing alloy can be pretreated by means of a tartaric acid-sulfuric acid-anodization (TSA) according to DIN EN 4704 (date: May 2012). Substrates of steel or based on steel can for instance be pretreated by means of a pretreatment according to DIN EN ISO 12944-4 (date: July 1998). The metallic substrate can be pretreated with a tartaric acid-sulfuric acid-anodization (TSA) according to DIN EN 4704 (date: May 2012). In some embodiments, a pretreatment of the metallic substrate with an aqueous solution containing phosphorus ions-containing compounds does not take place.

The coating composition according to the various embodiments herein can include those for the at least partial coating with a priming coat of such substrates, which are used in aircraft manufacturing, ship building and/or boat building, i.e. in particular for appropriate coating of substrates which are used for manufacturing aircraft, ships and/or boats, in particular aircraft.

Methods

The coating composition according to the various embodiments herein is suitable as a priming coat to be applied on an optionally at least partially coated substrate.

The various embodiments herein also relates to the use of such a coating composition for protection against corrosion of metallic substrates, in particular of metallic substrates in the area of aircraft manufacturing.

A further subject of the various embodiments herein is a multilayer coating obtainable according to the above-indicated process.

A further subject of the various embodiments herein is a metallic substrate at least partially coated with the coating composition.

A further subject of the various embodiments herein is an article or part made of at least one thus at least partially coated substrate.

The various embodiments herein will be elucidated with reference to the examples below.

EXAMPLES

Example 1

Testing Methods 1.1 Determination of the Non-Volatile Content

The determination of the non-volatile content takes place according to DIN EN ISO 3251 (date: June 2008). In this process 1 g sample is weighed into a previously dried aluminium dish and dried for 60 minutes at 130° C. in a drying cabinet, cooled in a desiccator and then recovered. The residue based on the total amount of the used sample corresponds to the non-volatile content.

1.2 Neutral Salt Spray Mist Test

The determination of the anti-corrosive effect of coats on a sample plate takes place with the neutral salt spray mist test (also known as salt spray test) following DIN EN ISO 9227:2012 DE. To this end two scratches are made with a cutter in cross-section on the metallic substrate coated with a coating composition or a comparative coating composition through the coat down to the substrate. In the test over a period of 3,000 h a 5% aqueous sodium chloride solution with a pH-value of the deposit of 6.5 to 7.2 (at 25±2° C.) at a test room temperature of 35±2° C. acts on the incised sample table. The dry film thickness of the coat is to be given in [μm]. Evaluated is the anti-corrosive effect according to the length of the penetration under the coat at the scratch.

1.3 Filiform Corrosion Test

The determination of the filiform corrosion serves to establish the resistance to corrosion of a coat on a substrate. This determination is carried out following DIN EN ISO 4623-2:2004-06 DE for the metallic substrate coated with a coating composition according to the various embodiments herein or comparative coating composition over a duration of 504 h and 1,008 h. In that process the coat in question, starting from linear damage to the coat, is penetrated in the form of a linear or filiform under-surface corrosion. The length of the longest thread and the average thread length in [mm] in that case are measured out according to ISO 4628-10. The length of the longest thread and the average thread length are a measure of the coat's resistance to corrosion.

Example 2

Preparation of iron(III)-tris(N,N-dithiocarbamate) Complexes (B)

For the preparation of iron(III)-tris(N,N-dimethyl dithiocarbamate) 200 mL of a 0.86 molar aqueous iron(III)nitrate nonahydrate solution in 300 mL of a 1.9 molar aqueous solution of sodium-dimethyl dithiocarbamate hydrate (CAS: 207233-95-2) was added dropwise and vigorously stirred for at least 6 h at a temperature of 15-25° C. After filtration over a traditional paper filter and drying at 40° C. a yield of >95% was obtained.

Iron(III)-tris(N,N-diethyl dithiocarbamate) was prepared corresponding to the above procedure, but instead of an aqueous solution of sodium-dimethyl dithiocarbamate hydrate an aqueous solution of sodium-diethyl dithiocarbamate trihydrate (CAS: 20624-25-3) was used. A yield of >90% was obtained.

Iron(III)-tris(N,N-pyrolidine dithiocarbamate) was prepared corresponding to the above procedure, but instead of an aqueous solution of sodium-dimethyl dithiocarbamate hydrate an aqueous solution of ammonium-pyrolidine dithiocarbamate (CAS: 5108-96-3) was used. A yield of >90% was obtained.

The molar ratio of iron(III) to the appropriate sodium or ammonium salt of the dithiocarbamate complex in that case was set at 1 to 3.3.

Example 3.1

Preparation of Coating Compositions V1 to V5 Not According to the Various Embodiments Herein The two components of the coating compositions V1 to V5 not according to the various embodiments herein were prepared as follows (Table 1): positions 1-5 were presented and predispersed 15 min, after which positions 6-12, where applicable, were added with stirring. After that, the mixture was dispersed for 30 min at maximum 50° C. to a granularity of less than 20 μm, measured with a Grindometer according to Hegman (ISO 1524), by means of a pearl mill. Positions 13 and 14 of component 1 were stirred in after the dispersion. The ingredients of component 2 were added together in the specified sequence and intimately mixed, after which the two components of the coating composition were mixed shortly before use.

TABLE 1 preparation of coating compositions V1 to V5 not according to the various embodiments herein

| Pos. | Ingredient | V1 | V2 | V3 | V4 | V5 |
|---|---|---|---|---|---|---|
| | component 1 | | | | | |
| 1 | Waterpoxy ® 751 | 17.75 | 17.75 | 17.75 | 17.75 | 17.75 |
| 2 | TMDD ® BG 52 | 1.90 | 1.90 | 1.90 | 1.90 | 1.90 |
| 3 | Butyl glycol | 0.63 | 0.63 | 0.63 | 0.63 | 0.63 |
| 4 | AMP-90 ® | 0.13 | 0.13 | 0.13 | 0.13 | 0.13 |
| 5 | VE-water | 13.79 | 13.79 | 13.79 | 13.79 | 13.79 |
| 6 | Lucenac ® 10MO | 9.83 | 9.02 | 8.21 | 8.90 | 7.97 |
| 7 | Aluminium silicate ASP 600 | 8.77 | 8.04 | 7.32 | 7.94 | 7.11 |
| 8 | Titanium rutile 2310 | 12.84 | 11.78 | 10.72 | 11.62 | 10.40 |
| 9 | Novacite ® L-207 A | 2.56 | 2.35 | 2.14 | 2.32 | 2.07 |
| 10 | Sillitin ® N 85 | 3.95 | 3.62 | 3.30 | 3.58 | 3.20 |
| 11a | Sodium-dimethyl dithiocarbamate | | 3.14 | 6.27 | | |
| 11b | Ammonium-pyrrolidine dithiocarbamate | | | | 3.60 | 7.20 |
| 12 | Che ® Coat DF 0682 | 0.19 | 0.19 | 0.19 | 0.19 | 0.19 |
| 13 | VE-water | 5.69 | 5.69 | 5.69 | 5.69 | 5.69 |
| 14 | Byk ® 346 | 0.63 | 0.63 | 0.63 | 0.63 | 0.63 |
| | component 2 | | | | | |
| 15 | Bisphenol-A-diglycidyl ether. $M_w$ < 700 g/mol | 13.34 | 13.34 | 13.34 | 13.34 | 13.34 |
| 16 | Silquest ® A-187 | 1.86 | 1.86 | 1.86 | 1.86 | 1.86 |
| 17 | Butyl acetate | 5.07 | 5.07 | 5.07 | 5.07 | 5.07 |
| 18 | water | 25.0 | 25.0 | 25.0 | 25.0 | 25.0 |

Waterpoxy® 751 is a commercially available amine adduct dissolved in water ex BASF. It has a solids content of 59 wt. %, based on its total weight.

TMDD® BG 52 is the trade designation for 2,4,7,9-tetramethyl-5-decin-4,7-diol, a commercially available surfactant ex BASF which acts as foam inhibitor or rather as wetting agent.

AMP-90® is the trade designation for 2-amino-2-methyl-1-propanol with 10% water ex Angus-Chemie GmbH, which serves as dispersion aid.

Lucenac® 10MO is a commercially available talcum ex Luzenac Europe SAS.

Novacite® L-207 A is a commercially available filler ex Malvern Minerals Co.

Sillitin® N 85 is a filler on silica-kaolinite basis, commercially available ex Hoffmann Mineral.

Che® Coat DF 0682 is a commercially available defoaming agent ex Erbslöh.

Byk® 346 is a commercially available wetting agent ex BYK with a solids content of 52 wt. %.

Silquest® A-187 is based on glycidoxypropyl trimethoxysilane and is commercially available ex Momentive with a solids content of 52 wt. %.

The coating composition V1 thus is free of any dithiocarbamate, while V2-V3 and V4-V5, respectively, contain readily soluble dithiocarbamates not to be used in the embodiments herein.

3.2 Preparation of Substrates Coated with Coating Compositions V1 to V5 Not According to the Various Embodiments Herein Each time one of the coating compositions V1 to V5 not according to the various embodiments herein is applied as primer coating on a table of a commercially available aluminium alloy (EN AW 2024, substrate T3 clad, where the clad layer is a cladding of purest aluminium) as substrate.

The sheets used in each case have a total surface of about 70 $cm^2$. Each sheet was pretreated by means of a tartaric acid-sulfuric acid-anodization (TSA) according to DIN EN 4704 (date: May 2012).

On each substrate (T3) is applied on one side one of the coating compositions V1 to V5 not according to the various embodiments herein by means of spraying with a spray gun. The dry film thickness in each case is 14-20 µm.

3.3. Investigation of the Anti-Corrosive Effect of Substrates Coated with Coating Compositions V1 to V5 Not According to the Various Embodiments Herein The previously described substrates T3V1, T3V2, T3V3, T3V4 and T3V5 coated with one of the coating compositions V1 to V5 were examined for their corrosion inhibition.

To prepare for the neutral salt spray mist test the thus coated tables were stored 7 days at 15-25° C., after which a cross cut with a width of 1 mm in a depth of 300 µm was scored.

To prepare for the filiform corrosion test the thus coated tables were stored 24 h at 15-25° C., whereupon a top coat layer (D1) was applied in a dry film thickness of 50 to 70 µm to obtain the coated sheets T3V1D1, T3V2D1, T3V3D1, T3V4D1 and T3V5D1. For application of the top coat layer in each case the commercial product Glasurit® of series 68 (RAL 9010), a 2K-polyurethane-based top coat, was used. The subsequent drying or rather curing took place by means of a storing of the coated sheets for a duration of 7 days at 15-25° C.

The neutral salt spray mist test and the filiform corrosion test were carried out in a test sequence corresponding to the above-indicated determination methods. The results are given in Tables 2 and 3, wherein each value is the average value of a dual determination, standardized to the result of T3V1.

TABLE 2

Results of the neutral salt spray mist test on 2024-T3-clad substrates coated with one of the coating compositions V1 to V5 not according to the various embodiments herein

| Substrate composition | Penetration in the neutral salt spray mist test, after 3,000 h |
|---|---|
| T3V1 | 1.0 |
| T3V2 | 1.6 |
| T3V3 | 1.1 |
| T3V4 | 1.7 |
| T3V5 | 1.0 |

TABLE 3

Results of the filiform corrosion test on 2024-T3-clad substrates coated with one of the coating compositions V1 to V5 not according to the various embodiments herein and a top coat D1.

| Substrate composition | Penetration in filiform corrosion test | |
|---|---|---|
| | 504 h | 1,008 h |
| T3V1D1 | 1.0 | 1.0 |
| T3V2D1 | 2.35 | 2.87 |
| T3V3D1 | 2.39 | 3.08 |
| T3V4D1 | 2.02 | 2.82 |
| T3V5D1 | 1.67 | 2.57 |

The results of Tables 2 and 3 show unequivocally that in comparison with coating composition V1, which is free of dithiocarbamates, adding readily water-soluble sodium-dimethyl dithiocarbamate (V2-V3) and moderately soluble ammonium-pyrrolidine dithiocarbamate (V4-V5), respectively, to the coating compositions leads to a clearly worse anti-corrosive effect, at best to one comparable to V1. The interaction of the readily or moderately water-soluble dithiocarbamates with the binder matrix of the coating composition thus appears to be unfavorable.

Example 4.1

Preparation of Coating Compositions E1 to E3 According to the Various Embodiments Herein and Comparative Coating Composition V6

The two components of the coating compositions E1 to E3 according to the various embodiments herein and the comparative coating composition V6 were prepared by adding the respective ingredients together in the specified sequence and intimately mixing them in a dissolver (Table 4).

The two components of the coating compositions E1 to E3 according to the various embodiments herein and the comparative coating composition V6 were prepared as follows (Table 4): positions 1-5 were presented and predispersed for 15 min, after which positions 6-12, where applicable, were added with stirring. After that, the mixture was dispersed for 30 min at maximum 50° C. to a granularity of less than 20 µm, measured with a Grindometer according to Hegman (ISO 1524), by means of a pearl mill. Positions 13 and 14 of component 1 were stirred in after the dispersion. The ingredients of component 2 were added together in the specified sequence and intimately mixed, after which the two components of the coating composition were mixed shortly before use.

TABLE 4

Preparation of coating compositions E1-E3 according to the various embodiments herein and comparative coating composition V6.

| Pos. | Ingredient | V6 | E1 | E2 | E3 |
|---|---|---|---|---|---|
| | component 1 | | | | |
| 1 | Waterpoxy ® 751 | 14.59 | 14.59 | 14.59 | 14.59 |
| 2 | TMDD ® BG 52 | 1.54 | 1.54 | 1.54 | 1.54 |
| 3 | Butyl glycol | 0.51 | 0.51 | 0.51 | 0.51 |
| 4 | AMP ®-90 | 0.10 | 0.10 | 0.10 | 0.10 |
| 5 | VE-water | 11.18 | 11.18 | 11.18 | 11.18 |
| 6 | Lucenac ® 10MO | 7.97 | 7.33 | 7.33 | 7.33 |
| 7 | Aluminium silicate ASP 600 | 7.11 | 6.54 | 6.54 | 6.54 |
| 8 | Titanium rutile 2310 | 10.41 | 9.58 | 9.58 | 9.58 |
| 9 | Novacite ® L-207 A | 2.07 | 1.91 | 1.91 | 1.91 |
| 10 | Sillitin ® N 85 | 3.20 | 2.95 | 2.95 | 2.95 |
| 11a | iron(III)-tris(N,N-diethyl dithiocarbamate) | | 2.46 | | |
| 11b | iron(III)-tris(N,N-dimethyl dithiocarbamate) | | | 2.46 | |
| 11c | iron(III)-tris(N,N-pyrrolidine dithiocarbamate) | | | | 2.46 |
| 12 | Che ® Coat DF 0682 | 0.15 | 0.15 | 0.15 | 0.15 |
| 13 | VE-water | 4.62 | 4.62 | 4.62 | 4.62 |
| 14 | Byk ®-346 | 0.51 | 0.51 | 0.51 | 0.51 |
| | component 2 | | | | |
| 15 | Bisphenol-A-diglycidyl ether. $M_w$ < 700 g/mol | 11.82 | 11.82 | 11.82 | 11.82 |
| 16 | Butylglycol acetate | 3.94 | 3.94 | 3.94 | 3.94 |
| 17 | water | 20.27 | 20.27 | 20.27 | 20.27 |

The coating compositions E1 to E3 according to the various embodiments herein thus contain an iron(III)-tris(N,N-dithiocarbamate) complex while the comparative coating composition V6 is free of any dithiocarbamates.

The amount of water added in the last step in the preparation of the coating compositions E1 to E3 and V6 serves to control the viscosity.

4.2 Preparation of Coated Substrates with the Coating Compositions E1 to E3 According to the Various Embodiments Herein and Comparative Coating Composition V6

One of the coating compositions E1 to E3 according to the various embodiments herein or the comparative coating composition V6 is in each case applied as primer coating to a table made of a commercially available aluminium alloy (EN AW 2024, substrate T3 clad, where the clad layer is a plating of purest aluminium) as substrate.

The sheets used in each case have a total surface of about 70 cm². Each sheet was pretreated by means of a tartaric acid-sulfuric acid-anodization (TSA) according to DIN EN 4704 (date: May 2012).

On each substrate (T3) is applied on one side one of the coating compositions E1 to E3 according to the various embodiments herein or the comparative coating composition V6 by means of spraying with a spray gun. The dry film thickness in each case is 20-35 μm.

4.3 Investigation of the Anti-Corrosive Effect of Substrates Coated with the Coating Compositions E1 to E3 According to the Various Embodiments Herein and the Comparative Coating Composition V6

The previously described substrates T3E1, T3E2, T3E3 and T3V6 coated with one of the coating compositions E1 to E3 and V6, respectively, were examined for their corrosion inhibition.

To prepare for the neutral salt spray mist test the thus coated tables were stored 7 days at 15-25° C., after which a cross cut with a width of 1 mm was scored in a depth of 300 μm.

To prepare for the filiform corrosion test the thus coated tables were stored 24 h at 15-25° C., whereupon a top coat layer (D1) was applied in a dry film thickness of 50 to 70 μm to obtain the coated sheets T3E1D1, T3E2D1, T3E3D1 and T3V6D1. For application of the top coat layer in each case the commercial product Glasurit® of series 68 (RAL 9010), a 2K polyurethane-based top coat, was used. The subsequent drying or rather curing took place by means of a storing of the coated sheets for a duration of 7 days at 15-25° C.

The neutral salt spray mist test and the filiform corrosion test were carried out in a test sequence corresponding to the above-indicated determination methods. The results are given in Tables 5 and 6, wherein each value is the average value of a dual determination, standardized to the result of T3V6.

TABLE 5

Results of the neutral salt spray mist test on 2024-T3-clad substrates coated with one of the coating compositions E1 to E3 according to the various embodiments herein or the comparative coating composition V6.

| Substrate composition | Penetration in the neutral salt spray mist test, after 3,000 h |
|---|---|
| T3V6 | 1.0 |
| T3E1 | 0.9 |
| T3E2 | 1.0 |
| T3E3 | 0.6 |

TABLE 6

Results of the filiform corrosion test on 2024-T3-clad substrates coated with one of the coating compositions E1 to E3 according to the various embodiments herein or the comparative coating composition V6 and a top coat D1.

| Substrate composition | Penetration following the filiform corrosion test | |
|---|---|---|
| | 504 h | 1,008 h |
| T3V6D1 | 1.00 | 1.00 |
| T3E1D1 | 1.00 | 0.96 |
| T3E2D1 | 0.74 | 0.77 |
| T3E3D1 | 0.82 | 0.70 |

The results of Tables 5 and 6 substantiate the improved anti-corrosive effect of coats prepared from one of the coating compositions E1 to E3 according to the various embodiments herein in comparison with a coat prepared from the comparative coating composition V6 on aluminium substrates (2024-T3 clad).

The neutral salt spray mist test (Table 5) shows that after 3,000 h the penetration of substrates T3E1 to T3E3 coated according to the various embodiments herein was at least comparable or clearly improved in comparison with the substrate T3V6 coated with comparative coating composition V6. The best result in the neutral salt spray mist test was obtained with iron(III)-tris(N,N-pyrrolidine dithiocarbamate).

The penetration as a result of filiform corrosion (Table 6) was likewise clearly improved. Already after 504 h a visible reduction of the penetration of T3E2D1 and T3E3D1 in comparison with T3V6D1 is shown. At a total test duration of 1,008 h all substrates T3E1D1 to T3E3D1 coated according to the various embodiments herein perform clearly better in part following filiform corrosion in comparison with substrate T3V6D1 coated with comparative coating composition V6.

The combination of the results of the two protection-against-corrosion tests of Tables 5 and 6 shows unequivocally that the substrates coated with a coating composition according to the various embodiments herein perform better in at least one of the two tests in comparison with the comparative example. While for example T3E2 after 3,000 h of neutral salt spray mist test shows only a comparable penetration, the penetration as a result of filiform corrosion on T3E2D1 is clearly improved vis-à-vis comparative example T3V6D1.

Example 5.1

Preparation of Coating Compositions E4 to E6 According to the Various Embodiments Herein and Comparative Coating Composition V7

In a further investigation the effect of the weight content of the dithiocarbamate complex on the coating composition, e.g. on iron(III)-tris(N,N-dimethyl dithiocarbamate) was examined. To this end further coating compositions E4 to E6 according to the various embodiments herein and a further comparative coating composition V7 were prepared (Table 7).

The two components of the coating compositions E4 to E6 according to the various embodiments herein and the comparative coating composition V7 were prepared in the following way (Table 7): positions 1-5 were presented and predispersed 15 min, after which positions 6-12, where applicable, were added with stirring. After that, the mixture was dispersed for 30 min at maximum 50° C. to a granularity of less than 20 µm, measured with a Grindometer according to Hegman (ISO 1524), by means of a pearl mill. Positions 13 and 14 of component 1 were stirred in after the dispersion. The ingredients of component 2 were added together in the specified sequence and intimately mixed, after which the two components of the coating composition were mixed shortly before use.

TABLE 7

Preparation of coating compositions E4-E6 according to the various embodiments herein and comparative coating composition V7.

| Pos. | Ingredient | V7 | E4 | E5 | E6 |
|---|---|---|---|---|---|
| | component 1 | | | | |
| 1 | Waterpoxy 751 | 17.75 | 17.75 | 17.75 | 17.75 |
| 2 | TMDD BG 52 | 1.90 | 1.90 | 1.90 | 1.90 |
| 3 | Butyl glycol | 0.63 | 0.63 | 0.63 | 0.63 |
| 4 | AMP-90 | 0.13 | 0.13 | 0.13 | 0.13 |
| 5 | VE-water | 13.79 | 13.79 | 13.79 | 13.79 |
| 6 | Lucenac 10MO | 9.83 | 9.04 | 8.26 | 7.47 |
| 7 | Aluminium silicate ASP 600 | 8.77 | 8.07 | 7.37 | 6.67 |
| 8 | Titanium rutile 2310 | 12.84 | 11.81 | 10.79 | 9.76 |
| 9 | Novacite L-207 A | 2.56 | 2.36 | 2.15 | 1.95 |
| 10 | Sillitin N 85 | 3.95 | 3.63 | 3.32 | 3.00 |
| 11 | iron(III)dimethyl dithiocarbamate | | 3.04 | 6.07 | 9.11 |
| 12 | Che Coat DF 0682 | 0.19 | 0.19 | 0.19 | 0.19 |
| 13 | VE-water | 5.69 | 5.69 | 5.69 | 5.69 |
| 14 | Byk-346 | 0.63 | 0.63 | 0.63 | 0.63 |
| | component 2 | | | | |
| 15 | Bisphenol-A-diglycidylether, $M_w$ < 700 g/mol | 13.34 | 13.34 | 13.34 | 13.34 |
| 16 | Silquest® A-187, adhesion promoter, Momentive | 1.86 | 1.86 | 1.86 | 1.86 |
| 17 | Butyl acetate | 5.07 | 5.07 | 5.07 | 5.07 |
| 18 | water | 20.00 | 20.00 | 20.00 | 20.00 |
| 19 | Butyl glycol | 2.75 | 2.75 | 2.75 | 2.75 |

5.2 Preparation of Coated Substrates with Coating Compositions E4 to E6 According to the Various Embodiments Herein and Comparative Coating Composition V7

One of the coating compositions E4 to E6 according to the various embodiments herein or the comparative coating composition V7 is in each case applied as a primer coating to a table made of a commercially available aluminium alloy (EN AW 2024, substrate T3 clad, where the clad layer is a plating of purest aluminium) as substrate.

The sheets used in each case have a total surface of about 70 cm². Each sheet was pretreated by means of a tartaric acid-sulfuric acid-anodization (TSA) according to DIN EN 4704 (date: May 2012).

On each substrate (T3) is applied on one side one of the coating compositions E1 to E3 according to the various embodiments herein or the comparative coating composition V6 by means of spraying with a spray gun. The dry film thickness in each case is 13-30 µm.

5.3 Investigation of the Anti-Corrosive Effect Substrates Coated with Coating Compositions E4 to E6 According to the Various Embodiments Herein and Comparative Coating Composition V7

The previously described substrates T3E4, T3E5, T3E6 and T3V7 coated with one of the coating compositions E4 to E6 and V7, respectively, were examined for their corrosion inhibition.

To prepare for the neutral salt spray mist test the thus coated tables were stored 7 days at 15-25° C., after which a cross cut with a width of 1 mm was scored in a depth of 300 µm.

To prepare for the filiform corrosion test the thus coated tables were stored 24 h at 15-25° C., whereupon a top coat layer (D1) was applied in a dry film thickness of 50 to 70 µm to obtain the coated sheets T3E4D1, T3E5D1, T3E6D1 and T3V7D1. For application of the top coat layer in each case the commercial product Glasurit® of series 68 (RAL 9010), a 2K polyurethane-based top coat, was used. The subsequent drying or rather curing took place by means of a storing of the coated sheets for a duration of 7 days at 15-25° C.

The neutral salt spray mist test and the filiform corrosion test were carried out in a test sequence corresponding to the above-indicated determination methods. The results are given in Tables 8 and 9, wherein each value is the average value of a dual determination, standardized to the result of T3V7.

TABLE 8

Results of the neutral salt spray mist test on 2024-T3-clad substrates coated with one of the coating compositions E4 to E6 according to the various embodiments herein or comparative coating composition V7.

| Substrate composition | Penetration, 3,000 h |
|---|---|
| T3V7 | 1.0 |
| T3E4 | 0.83 |
| T3E5 | 0.64 |
| T3E6 | 0.93 |

TABLE 9

Results of the filiform corrosion test on 2024-T3-clad substrates coated with one of the coating compositions E4 to E6 according to the various embodiments herein or comparative coating composition V7 and a top coat D1.

| Substrate composition | Penetration | |
| --- | --- | --- |
| | 504 h | 1008 h |
| T3V7D1 | 1.00 | 1.00 |
| T3E4D1 | 0.69 | 1.02 |
| T3E5D1 | 0.61 | 0.89 |
| T3E6D1 | 0.64 | 0.93 |

The results from Tables 8 and 9 once again substantiate the clearly improved anti-corrosive effect of coats prepared from coating compositions E4 to E6 according to the various embodiments herein in comparison with a coating prepared from comparative coating composition V7 on aluminium substrates (2024-T3 clad).

In this test series the penetration following the neutral salt spray mist test after 3,000 h (Table 8) of the substrates coated with a coating composition E4 to E6 according to the various embodiments herein is clearly improved in comparison with the substrate coated with comparative coating composition V7. Moreover, it is made clear that a further increase of the weight content of iron(III)-tris(N,N-dimethyl dithiocarbamate) complexes probably will not lead to a further improvement of the anti-corrosive effect.

The penetration as a result of filiform corrosion (Table 9) is comparable or was likewise improved. After 504 h, all examples according to the various embodiments herein exhibit a visible reduction of the penetration in comparison with T3V7D1. At a total test duration of 1,008 h, all substrates T3E4D1 to T3E6D1 coated according to the various embodiments herein following filiform corrosion score the same or better in comparison with the substrate T3V7D1 coated with comparative coating composition V7.

With the tests carried out as an example for the present various embodiments herein it could be shown that a chromium-free coating composition was found which after application on a substrate, in particular an aluminium substrate from the area of aircraft manufacturing, has a surprisingly good or clearly improved anti-corrosive effect in comparison with prior art coatings.

The good anti-corrosive effect of coatings according to the various embodiments herein containing poorly water-soluble dithiocarbamate complexes (B) (E1 to E6) is unexpected inasmuch as coatings containing easily water-soluble dithiocarbamates (V2 to V5), such as described in the prior art, lead to a clearly worse protection against corrosion of coatings (compare Tables 5-6 with Tables 8-9). Coatings containing easily water-soluble dithiocarbamates are actually inferior to coatings which are free of dithiocarbamates (V1, V6, V7) (cf. Tables 2-3).

The invention claimed is:

1. An aqueous chromium-free coating composition comprising
at least one binder comprising
at least one synthetic resin and
at least one crosslinker,
at least one iron(III)-tris(N,N-dithiocarbamate) complex of the general formula (I)
$[R^1—N(—R^2)—C(=S)—S]_3Fe^{+III}$
wherein
(i) $R^1$ and $R^2$, independently comprise a univalent linear, branched or cyclic aliphatic hydrocarbon radical with 1 to 10 carbon atoms; or
(ii) $R^1$ comprises a divalent linear or branched aliphatic hydrocarbon radical with 1 to 10 carbon atoms, $R^2$ represents a covalent bond and $R^1$ is linked by the covalent bond with the nitrogen atom of formula (I); and
wherein the water content in the coating composition is at least 50.0 wt. % based on the total content of liquid diluents present in the coating composition; and
wherein the binder comprises at least one epoxide resin and at least one crosslinker having at least one functional amino group.

2. The coating composition of claim 1, wherein the iron(III)-tris(N,N-dithiocarbamate) complex has a solubility in water at 20° C. of less than 0.1 mol/L.

3. The coating composition of claim 1, wherein the iron(III)-tris(N,N-dithiocarbamate) complex is present in an amount in the range of 0.01 to 25 wt. %, based on the non-volatile content of the coating composition as determined according to DIN EN ISO 3251 dated June 2008.

4. The coating composition of claim 1, wherein the at least one iron(III)-tris(N,N-dithiocarbamate) complex is selected from the group consisting of: iron(III)-tris(dimethyl dithiocarbamate), iron(III)-tris(diethyl dithiocarbamate) and iron(III)-tris(pyrrolidine dithiocarbamate).

5. The coating composition of claim 1, wherein the at least one epoxide resin has an epoxide equivalent weight in a range of 100 to 300, as determined according to DIN EN ISO 3001 dated November 1999.

6. The coating composition of claim 1, wherein the coating compositing is configured for protection against corrosion of metallic substrates.

7. The coating composition of claim 6, wherein the metallic substrates comprise metallic substrates within the area of aircraft manufacturing.

8. A process for at least partially coating a metallic substrate with a priming coat comprising,
at least partially contacting the metallic substrate with the coating composition comprising
at least one binder comprising
at least one crosslinker;
at least one iron(III)-tris(N,N-dithiocarbamate) complex of the general formula (I) comprising $[R^1—N(—R^2)—C(=S)—S]_3Fe^{+III}$
wherein
(i) $R^1$ and $R^2$, independently comprise a univalent linear, branched or cyclic aliphatic hydrocarbon radical with 1 to 10 carbon atoms; or
(ii) $R^1$ comprises a divalent linear or branched aliphatic hydrocarbon radical with 1 to 10 carbon atoms, $R^2$ represents a covalent bond and $R^1$ is linked the covalent bond with the nitrogen atom of formula (I); and
wherein the water content in the coating composition is at least 50.0 wt. % based on the total content of liquid diluents present in the coating composition.

9. The process of claim 8
wherein at least partially contacting the metallic substrate with the coating composition comprises at least partially applying a priming coat on the substrate; and
applying at least one further layer, comprising a top coat layer or a clear coat layer, on the priming coat.

10. The process of claim 8, wherein before at least partially contacting the metallic substrate with the coating composition, the metallic substrate is pretreated with a tartaric acid-sulfuric acid-anodization (TSA) according to DIN EN 4704.

11. The process of claim 8, wherein the metallic substrate is an aluminium alloy of the group 2XXX or 7XXX.

12. A metallic substrate coated at least partially with a coating composition the coating composition comprising:
- at least one binder comprising
  - at least one crosslinker;
- at least one iron(III)-tris(N,N-dithiocarbamate) complex of the general formula (I) comprising $[R^1-N(-R^2)-C(=S)-S]_3Fe^{+III}$
- wherein
  - (i) $R^1$ and $R^2$, independently comprise a univalent linear, branched or cyclic aliphatic hydrocarbon radical with 1 to 10 carbon atoms; or
  - (ii) $R^1$ comprises a divalent linear or branched aliphatic hydrocarbon radical with 1 to 10 carbon atoms, $R^2$ represents a covalent bond and $R^1$ is linked by means of the covalent bond with the nitrogen atom of formula (I); and
- wherein the water content in the coating composition is at least 50.0 wt. % based on the total content of liquid diluents present in the coating composition.

* * * * *